Oct. 3, 1944.  F. B. SLOAN  2,359,393

QUICK HEATING DEVICE

Filed April 29, 1942

INVENTOR
Franklyn B. Sloan
BY
Blair, Curtis & Hayward
ATTORNEY

Patented Oct. 3, 1944

2,359,393

UNITED STATES PATENT OFFICE 2,359,393

QUICK HEATING DEVICE

Franklyn B. Sloan, Brooklyn, N. Y.

Application April 29, 1942, Serial No. 440,894

1 Claim. (Cl. 219—26)

This invention relates to a quick heating device.

An object of the invention resides in the provision of a device which will quickly generate heat in a given locality by means of a resistance interposed in a electric circuit substantially at the point where the creation of the heat is desired, and one which may be so controlled by the operator that the heating may be periodical to thus obviate the necessity of a continuous flow of electric current during the use of the device.

While my device is not so limited, I have chosen to illustrate it as embodied in a soldering iron which is admirably adapted for use in radio work where it is necessary periodically to apply solder and where it is undesirable to have a continuous heating of the soldering iron during the time that is consumed by the operator in preparing for the soldering operation.

Figure 1:
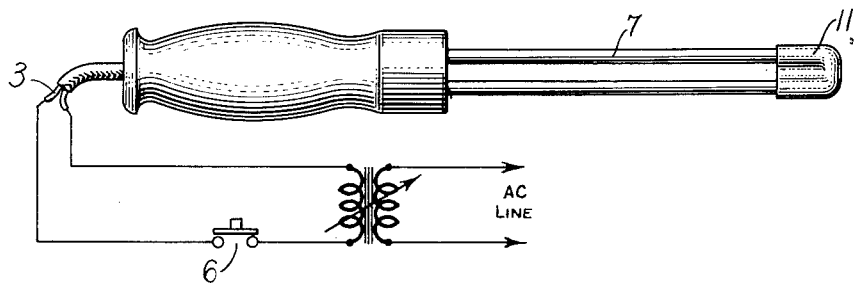
Figure 1 is a side elevation of the invention embodied in a soldering iron showing diagrammatically the electric circuit from an A. C. source through the soldering iron, a variable transformer and a switch which may be manually or pedally operated.
Figure 2:
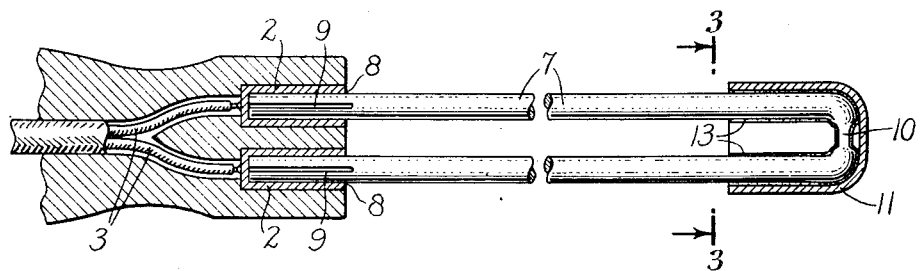
Figure 2 is a somewhat enlarged longitudinal section of the device with the handle partly broken away.
Figure 3:
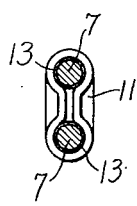
Figure 3 is a section on line 3—3 of Figure 2.

The embodiment of the invention illustrated includes a handle 1 which is provided with sockets 2 electrically connected by wires 3 to an A. C. source 4, there being interpolated in the line a variable transformer 5 and a switch 6 which may be either manually or pedally operated.

A substantially U-shaped rod 7 having frictional and electrical contact at 8 with the sockets 2 is provided. This contact may be maintained by slight deformation of the ends of the rod 7 by means of slots 9, or of course by omitting the slots and imparting resiliency to the sockets 2. Indeed any form of removable engagement between the ends of the rods 7 and the sockets 2 may be used. The manner of electrically contacting the ends of the wires 3 with the rod 7 is unimportant and any conventional means may be used. It is only important that, in one phase of the invention, the rods 7 may be removable.

This rod is preferably of a high resistance metal such as Nichrome, but in the major portion of its length is of relatively large diameter so that it interposes little resistance in the circuit. At the bight portion 10 the diameter of the rod is reduced to at this point increase the resistance with the result that when the circuit is completed the rod will heat rapidly at the point 10. In order that this heat may be quickly dissipated and may be used, for instance, for the purpose of melting solder, I have provided a tip 11 which is secured to the end of the rod as at 12. This metal is of high heat conductivity so that the heat generated by the resistance at 10 will be quickly dissipated and quickly heat the tip 11 so that it may be used, for instance, in melting solder.

The use of many metals for this tip 11 is contemplated, but either copper or silver will be admirably adapted for the purpose.

The rod 7 is electrically insulated from the tip 11 as at 13 by any means which will electrically insulate but will permit the conduction of the heat from the resistance portion 10 of the rod 7 to the tip 11. This insulation may be accomplished by interposing a separate insulating element around the end of the bight portion of the rod or by oxidizing the portion of the Nichrome rod which is housed within the tip or the interior surface of the tip itself.

In using the device as a soldering iron when the switch 6 takes the form of a pedally operated switch the operator will be free to melt solder periodically with cooling periods in between the soldering operation by simply controlling the closing and opening of the switch with his foot.

This will be of considerable advantage in such work as radio work or where it is desired to quickly heat an element and permit intervening periods of cooling.

Of course the removability of the rod 7 makes it possible to replace this rod with a different unit as such becomes necessary or desirable either from the point of view of changing the resistance or replacing a worn element by a new element.

While I have illustrated and described the particular form of my invention it is to be understood that I will only be restricted to that form in so far as is necessitated by the claim.

What I claim is:

A quick heating device comprising an insulating holder, a current carrying rod of low electric resistance carried thereby having an integral insulated portion of high electric resistance and of reduced cross section and a working tip of high heat conductivity enveloping the insulated portion of the rod and electrically insulated therefrom, said working tip being of sufficient extent to envelop a portion of the rod of low electric resistance.

FRANKLYN B. SLOAN.